United States Patent [19]

Fontaine et al.

[11] 4,424,843
[45] Jan. 10, 1984

[54] PNEUMATIC TIRE TREAD

[75] Inventors: Jean F. L. Fontaine, Bürden, Luxembourg; Maurice Graas, Schockville, Belgium

[73] Assignee: The Goodyear Tire & Rubber Company, Akron, Ohio

[21] Appl. No.: 358,943

[22] Filed: Mar. 17, 1982

[51] Int. Cl.³ .............................................. B60C 11/00
[52] U.S. Cl. ................................ 152/209 R; D12/139
[58] Field of Search .......... 152/209 R, 209 A, 209 D; D12/139, 136, 142, 143, 144

[56] References Cited

U.S. PATENT DOCUMENTS

| D. 100,118 | 6/1936 | Nellen et al. ...................... D12/146 |
| D. 112,978 | 1/1939 | James ................................. D12/144 |
| D. 113,651 | 3/1939 | Balthazar ........................... D12/141 |
| D. 236,710 | 9/1975 | Buck et al. ........................ D12/144 |
| 3,674,077 | 7/1972 | Verdier ........................... 152/209 R |
| 3,705,613 | 12/1972 | Verdier ........................... 152/209 R |
| 4,057,089 | 11/1977 | Johannsen ........................ 152/209 R |

FOREIGN PATENT DOCUMENTS 200054 10/1971 France .
1000844 9/1981 United Kingdom .

Primary Examiner—Michael W. Ball
Attorney, Agent, or Firm—Frank Pincelli

[57] ABSTRACT

A pneumatic radial passenger tire having a tread portion provided with a pair of tread edges spaced apart axially of the tire, the tread portion being provided with a plurality of main grooves associated with each tread edge spaced circumferentially apart. Each of the main grooves following substantially identical paths axially inwardly and circumferentially of the tire. Each main groove having an axially outer end which opens outwardly of the tread edge and an axially inner edge which terminates at a distance from its associated tread edge of at least forty percent (40%) of the tread width. Each main groove having a first branch and a second branch extending therefrom in a generally opposite circumferential direction from which said main grooves extend. The first branch extends from its main groove towards and terminating in communication with the next circumferentially adjacent groove. Each second branch extends from its main groove past the next circumferentially adjacent main groove towards at least and in close proximity with the second circumferentially adjacent main groove.

19 Claims, 3 Drawing Figures

PNEUMATIC TIRE TREAD

The foregoing abstract is not to be taken as limiting the invention of this application, and in order to understand the full nature and extent of the technical disclosure of this application, reference must be made to the accompanying drawings and the following detailed description.

BACKGROUND OF THE INVENTION

The present invention relates to pneumatic tires and more particularly to a novel tread configuration for tires of the radial type construction.

The tread portion of a tire is generally defined by a plurality of grooves or depressions which form ground-engaging relief elements. The particular configuration of these relief elements has a significant effect upon the dry traction, wet traction, snow traction, noise level and rolling resistance of the tire. Generally, any particular tread pattern selected for any tire involves a compromise between these performance characteristics. Particular performance characteristics of a tire and the compromises between these performance characteristics are not generally known until a tire is actually made and tested.

Applicants have discovered a new tread configuration wherein low rolling resistance compounds can be used in the tread portion of the tire while maintaining acceptable levels of performance in dry traction, wet traction, snow traction and noise level.

DETAILED DESCRIPTION OF THE DRAWINGS

Figure 1:
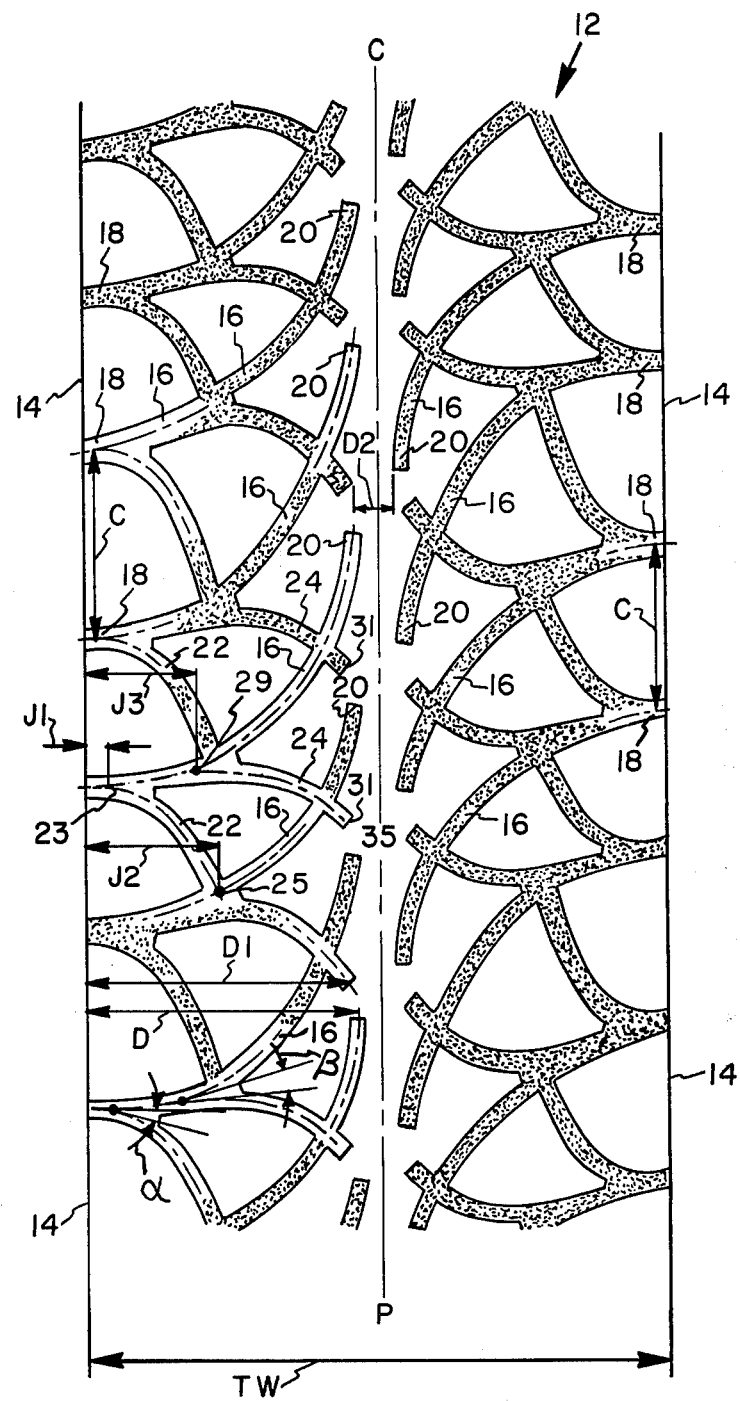
FIG. 1 is a fragmentary plan view of the tread portion of a tire made in accordance with the present invention.

Referring to FIG. 1, there is illustrated a fragmentary plan view of the ground-engaging tread portion 12 of a pneumatic tire made in accordance with the present invention. The tire of the present invention is designed to be used with passenger vehicles and is of the radial type construction. For the purposes of this invention, a radial tire is a tire in which the cords of the carcass reinforcing ply structure are oriented at an angle with respect to the mid-circumferential centerplane CP of the tire in the range of about 75 degrees to 90 degrees.

The tread portion 12 comprises a pair of axially spaced apart tread edges 14 which form the axially outer boundary of the ground-engaging tread portion 12. Where the term "axially" is used herein it refers to the axis of rotation of the tire or a direction parallel thereto and when the term "circumferentially" is used it refers to a direction coinciding with or parallel to the mid-circumferential centerline of the tread.

Associated with each tread edge 14, there is provided a plurality of main grooves 16 each having an axially outer end 18 which opens axially outwardly of the tire and into its associated tread edge 14 and an axially inner end 20 which terminates from its respective tread edge a distance D of at least forty percent (40%) of the tread width TW, preferably of at least forty-five percent (45%) of the tread width TW. For the purposes of this invention, the tread width TW is the maximum axial distance across the tread 12 as measured perpendicular to the mid-circumferential centerplane CP of the tire from tread edge 14 to tread edge 14 as taken from the footprint of a tire inflated to recommended inflation pressure and at rated load. The main grooves 16 which extend from the same tread edge 14 each follow substantially identical paths from their associated tread edge axially inwardly to their axially inner end 20. The main grooves 16 associated with each tread edge 14 are disposed about the tire such that their respective axially inner ends 18 are spaced apart in a circumferential direction a distance C between twenty percent (20%) and forty percent (40%) of the tread width TW, preferably between twenty-five percent (25%) and thirty-five percent (35%). Each main groove 16 extends from its axially outer end 18 in a generally curvilinear path axially inwardly and circumferentially of the tire towards its axially inner end 20. The center of curvature of each main groove 16 is disposed on the side thereof facing in the direction of the respective associated tread edge 14. Preferably, the center of curvature of each main groove is disposed closely adjacent the tread edge with which each main groove 16 is associated and is spaced from the tread edge 14 a distance no greater than approximately five percent (5%) of the tread width TW. The curvilinear path which each main groove 16 follows is such that the axially outer end 18 thereof extends primarily in an axial direction, that is, the center line of the axially outer end as it approaches its respective associated tread edge 14 forms an angle with respect to the mid-circumferential centerplane no less than about 75 degrees and preferably no less than about 80 degrees. The axially inner end 20 of each main groove 16 extends primarily in a circumferential direction, that is, the centerline of the axially inner end forms an angle preferably no less than about 30 degrees with respect to the mid-circumferential centerplane of the tire and preferably no greater than 15 degrees. In the particular embodiment illustrated, the centerline of the axially outer end 18 of each groove 16 forms an angle of approximately 80 degrees with respect to the mid-circumferential centerplane CP and the centerline of the axially inner end 20 forms an angle of approximately 15 degrees with respect to the mid-circumferential centerplane CP. Each main groove 16 follows a generally curvilinear path which has a radius of curvature which is greater at the axially outer end than at the axially inner end thereof. Preferably, the radius of curvature of each main groove 16 ranges from about forty percent (40%) to sixty percent (60%) of the tread width TW, preferably from about forty-five percent (45%) to fifty-five percent (55%) of the tread width.

In the particular embodiment illustrated, the radius of curvature of main grooves 16 progressively changes along its length in a generally continuous manner; however, the present invention is not limited to such. The change in radius may occur in step-like increments along its length which for example, may be obtained by short straight groove segment lengths.

Figure 2:
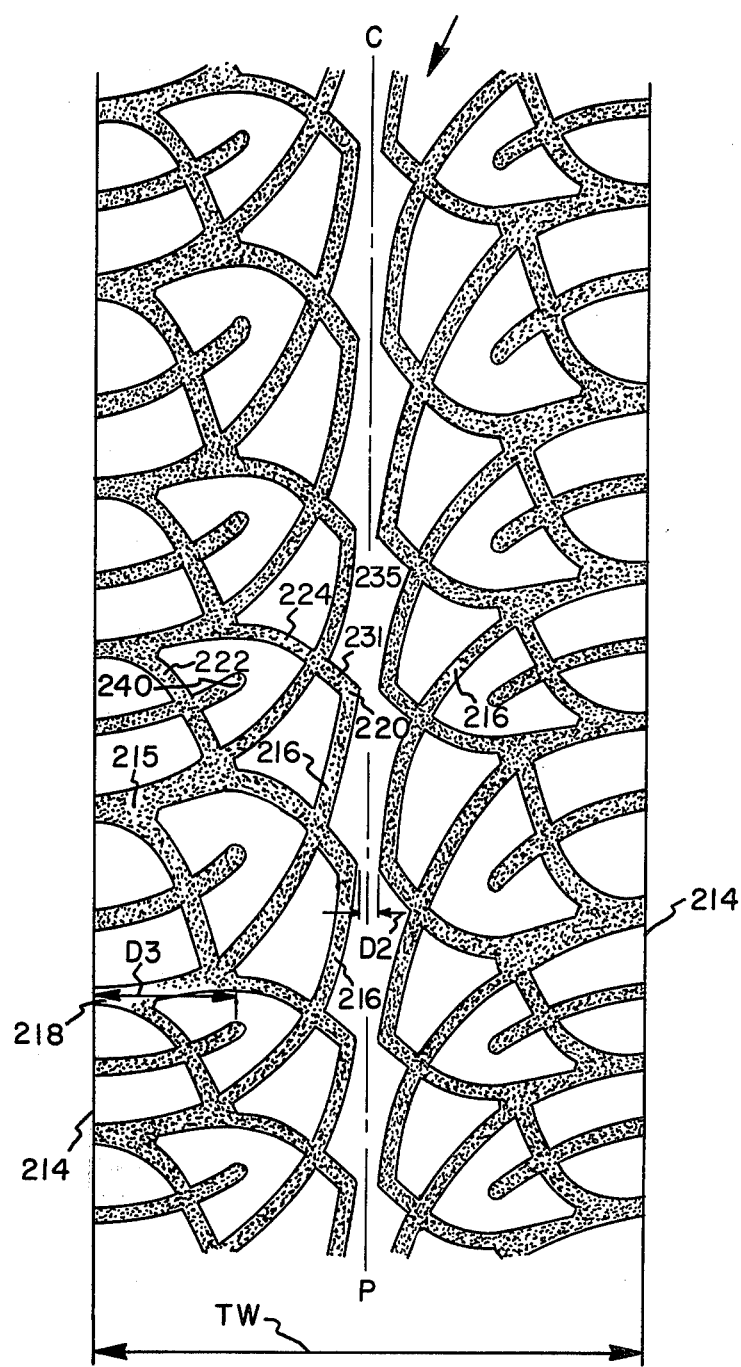
FIG. 2 is a fragmentary plan view of a modified tread portion of a tire made in accordance with the present invention.
Figure 3:
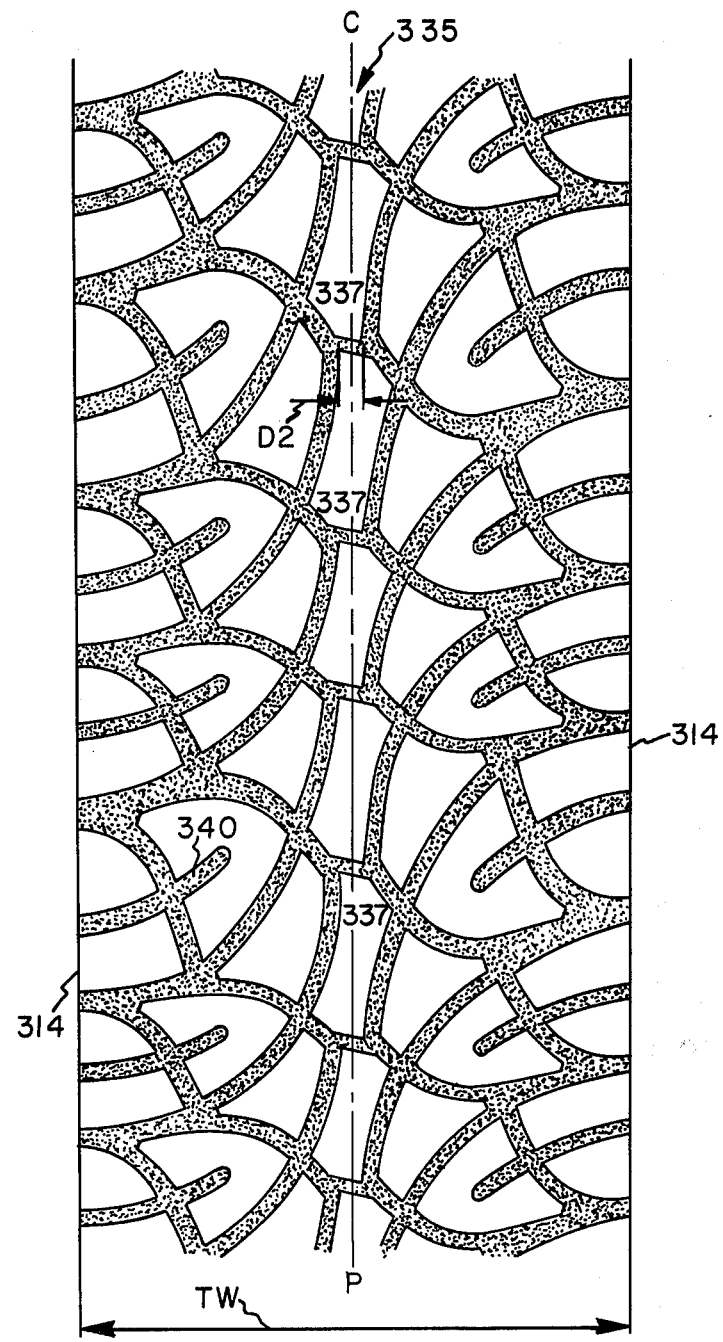
FIG. 3 is a fragmentary plan view of yet another modified tread portion for a tire made in accordance with the present invention.

The main grooves 16 which extend from one tread edge preferably extend in a generally opposite circumferential direction from the grooves 16 which extend from the other tread edge 14 as is illustrated in FIGS. 1, 2 and 3.

While the particular embodiment illustrated in FIG. 1 illustrates that each main groove 16 follows a smooth curvilinear path, the present invention is not limited to such. For example, as previously noted, the main grooves 16 may be formed by a plurality of short straight groove segments (not shown) having a generally overall curvilinear path as previously set forth.

Each main groove 16 is provided with a first branch 22 and a second branch 24, each extending axially inward from its respective main groove in a generally opposite circumferential direction from which the main groove 16 extends. Each first branch 22 extends from its respective main groove 16 towards and terminates in communication with the next circumferentially adjacent main groove 16. By "next circumferentially adjacent main groove" is meant the nearest main groove which extends from the same tread edge and is disposed in the circumferential direction which first branch 22 extends. The juncture 23 of the centerline of the first branch 22 and its respective main groove 16 is spaced from the tread edge 14 with which the specific main groove is associated a distance J1 of between zero percent (0%) and ten percent (10%) of the tread width TW, preferably no greater than five percent (5%). In the particular embodiment illustrated, the distance J1 is approximately five percent (5%) of the tread width TW. The juncture 25 of the centerline of each branch 22 and the centerline next circumferentially adjacent main groove 16 is spaced from its associated tread edge 14 a distance J2 of between fifteen percent (15%) and thirty percent (30%) of the tread width TW. In the particular embodiment illustrated, the distance J2 is approximately twenty-five percent (25%). The branch 22 merges with main groove 16 at a small angle α such that the centerline of branch 22 and centerline of groove 16 at the juncture 23 form an included angle α no greater than about 30 degrees and preferably, no greater than about 15 degrees. For the purposes of this invention, the included angle α shall be the angle formed between the centerline of grooves 16 and the centerline of groove 20 as taken from the overall direction of each centerline at the juncture 23, generally this can be obtained by determining the tangent of each centerline at this juncture 23. Preferably, each branch 22 extends from its respective main groove 16 in a generally curvilinear path axially inwardly and circumferentially of the tire such that the center of curvature of branch 22 is disposed on the side thereof facing in the direction of respective tread edge 14.

The juncture 29 of the centerline of the second branch 24 and the centerline of its respective main groove 16 is spaced from its associated tread edge 14 a distance J3 of between ten percent (10%) and thirty percent (30%) of the tread width TW. In the particular embodiment illustrated, the distance J3 is approximately twenty percent (20%) of the tread width TW. Each branch 24 has an axially inner end 31 which extends past the next circumferentially adjacent main groove 16 and terminates at a point which is spaced from the associated tread edge a distance D1 of at least forty percent (40%) of the tread width TW as measured from the centerline of the grooves. In the particular embodiment illustrated, the distance D1 is approximately forty-five percent (45%) of the tread width TW. The centerline of branch 24 forms an included angle B with the centerline of its respective main groove 16 at the juncture 29 which is no greater than about 30 degrees and preferably no greater than about 15 degrees. The included angle B is measured in the same manner which included angle α is measured. The branch 24 preferably extends from its juncture 29 in a generally curvilinear path axially inwardly and circumferentially of the tire such that the center of curvature is disposed on the side thereof facing in a direction of the respective associated tread edge 14. The axially inner end 31 of branch 24 terminates past the next adjacent main groove 18 at a point which is in close proximity with the axially inner end 20 of the second circumferentially main groove 16 and preferably spaced apart a distance no greater than approximately ten percent (10%) of the tread width TW. By "second circumferentially adjacent main groove" is meant the second nearest main groove which extends from the same tread edge and is disposed in the circumferential direction which second branch 24 extends. While the axially inner end 31 of branch 22 can extend up to and in communication with the second circumferentially adjacent groove 16, it does not extend past this groove.

The main grooves 16 and their respective branches which are associated with any one tread edge 14 are spaced apart axially of the tire from the main grooves 16 and their respective branches which are associated with the other tread edge so as to form a continuous circumferentially extending rib 35 therebetween as illustrated in FIG. 1.

Referring to FIG. 2, there is illustrated a modified form of the present invention wherein the tread 212 has a pair of axially spaced apart tread edges 214. The tread 212 is provided with a plurality of main grooves 216 each having an axially outer end 218 and an axially inner end 220. The main grooves 216 following the same relationship as grooves 16 of FIG. 1. Extending from each main groove 216 is a first branch 222 and a second branch 224 which extend in a direction circumferentially of the tire opposite to that of main groove 216. Each branch 222 extends from its main groove towards the next adjacent main groove 216 so as to be in communication therewith and follow the same relationships as grooves 22 of FIG. 1. Each branch 224 follow the same relationships as branch 24 except that the axially inner end 231 of branch 224 is connected to and in communication with the axially inner end 220 of the second circumferentially adjacent main groove 216. In the embodiment illustrated in FIG. 2, the axially inner end 231 of branch 224 and the axially inner end 220 of the second circumferentially adjacent main groove 216 are extended until they meet. However, the present invention is not limited to such as the axially inner ends may be joined by a connecting groove of any desired configuration, preferably by a connecting groove which extends primarily in a circumferential direction of the tire, that is, a groove having an overall path which forms an angle not greater than 30 degrees with respect to the mid-circumferential centerplane CP. The main groove 216 which extends from one tread edge 214 is spaced axially of the main groove 216 extending from the other tread edge so as to form a circumferentially extending rib 235.

While it is preferred that the tread of the present invention be provided with a circumferentially extending rib as illustrated in FIGS. 1 and 2, the present invention is not limited to such.

Referring to FIG. 3, there is illustrated another modified form of the present invention wherein the rib 35 of FIG. 1 or rib 235 of FIG. 2 is replaced by a broken rib 335 which comprises a plurality of independent relief elements 337. The main grooves of FIGS. 1, 2 and 3 and their respective second branches and any groove connecting to the second branch with the second circumferentially adjacent groove are spaced axially apart from the main grooves and their respective branches and any connecting groove associated with the other tread edge a distance D2 of between five percent (5%) and twenty percent (20%) of the tread width TW, preferably between five percent (5%) and ten percent (10%) of the tread width. Main grooves 16 and their respective second branch and any connecting groove which extend from the opposite tread edges are preferably spaced an equal distance from the mid-circumferential centerplane CP between two percent (2%) and ten percent (10%) of the tread width TW.

If desired, as is illustrated in FIGS. 2 and 3, there may be provided an additional axially extending intermediate groove 240 or 340 respectively which extends axially inward from each tread edge terminating at its axially inner end at a point spaced from the tread edge a distance D3 no greater than about thirty-five percent (35%) of the tread width TW, and preferably no greater than thirty percent (30%) of the tread width TW. One intermediate groove 240 is preferably disposed between circumferentially adjacent main grooves 216, preferably midway between adjacent main grooves. Each intermediate groove 240 follows a path which is generally parallel to the main grooves 16 which are disposed between.

Main grooves 16, branches 22, branches 24 and any intermediate groove or connecting groove which may be present in the tire each have a cross-sectional width such that when in the footprint of the tire the grooves do not close up at the surface of the tread so as to provide a water channeling passage in the tread portion 12. Preferably, the ground-engaging relief elements formed by these grooves are devoid of any slot or narrow groove having a width substantially smaller than the main grooves or branches, preferably the relief elements do not have any grooves which would close up when in the footprint of the tire at the tread surface.

While certain representative embodiments and details have been shown for the purposes of illustrating the invention, it will be apparent to those skilled in the art that various changes and modifications may be made therein without departing from the spirit or scope of the invention. For example, and not limited to, the tread pattern may be pitched in accordance with normal tread pattern pitching techniques. That is, the repeating circumferential designs that may be varied about the circumference of the tire in accordance with the prearranged sequence.

We claim:

1. A pneumatic radial passenger tire having a tread portion provided with a pair of tread edges spaced apart axially of the tire, the tread portion being provided with a plurality of main grooves associated with each tread edge, each of the main grooves following substantially identical paths, each of said main grooves having an axially outer end which opens outwardly of the associated tread edge and an axially inner end which terminates at a distance from said associated tread edge of at least forty percent (40%) of the tread width, the main grooves at their associated tread edges being spaced apart in a direction circumferentially of the tire a distance between twenty percent (20%) and forty percent (40%) of the tread width, the main grooves associated with any one tread edge extending from the axially outer end thereof in a generally curvilinear path axially inwardly and circumferentially of the tire with the main grooves associated wth any one tread edge extending in the same direction circumferentially of the tire, the center of curvature of each main groove being disposed on the side thereof facing in the direction of the respective associated tread edge, each main groove having a first branch and a second branch extending therefrom in a generally opposite circumferential direction from that which said main grooves extend, each first branch extending from its main groove towards and terminating in communication with the next circumferentially adjacent groove, the juncture of said first branch and its main groove being spaced from the associated tread edge a distance of between zero percent (0%) and ten percent (10%) of the tread width TW, the juncture of each first branch and the next circumferentially adjacent main groove being spaced from the associated tread edge a distance of between fifteen percent (15%) and thirty percent (30%) of the tread width, each second branch extending from its main groove past the next circumferential adjacent main groove towards at least and in close proximity with the second next circumferential main groove but not past the second next circumferentially adjacent main groove, the juncture of each second branch and its respective main groove being spaced from the associated tread edge a distance of between ten percent (10%) and thirty percent (30%) of the tread width, the axially inner end of each said second branch being spaced from its associated tread edge a distance of at least forty percent (40%) of the tread width, the included angle formed between the centerline of each main groove and the centerline of its first branch at the juncture thereof being no greater than about 30 degrees, the included angle formed between the centerline of each main groove and the centerline of its second branch at the juncture thereof being no greater than about 30 degrees, the main grooves, first branches and second branches providing the majority of grooves in the tread.

2. The pneumatic radial passenger tire according to claim 1 wherein the axially outer end of each of said main grooves extends primarily axially of the tire.

3. The pneumatic radial passenger tire according to claim 1 wherein each of said first branches extend from their respective main groove in a generally curvilinear path axially inwardly and circumferentially of the tire, the center of curvature of said first branch being disposed on the side thereof facing in the direction of the respectively associated tread edge.

4. The pneumatic radial passenger tire according to claim 1 wherein each of said second branches extend from its respective main groove in a generally curvilinear path axially inwardly and circumferentially of the tire, the center of curvature of said second branch being disposed on the side thereof facing in the direction of the respectively associated tread edge.

5. The pneumatic radial passenger tire according to claim 1 having an axially intermediate groove between circumferentially adjacent main grooves, each intermediate groove extending axially inwardly from the tread edge terminating at its axially inner end at a point spaced from the tread edge from which it extends a distance no greater than thirty-five percent (35%) of the tread width.

6. The pneumatic radial passenger tire according to claim 1, 2, 3 or 4 wherein the axially inner end of each of said second branches being connected to and brought into communication with the second circumferentially adjacent main groove.

7. The pneumatic radial passenger tire according to claim 1, 2, 3, 4 or 5 wherein the included angle between the centerline of each main groove with the centerline of the respective first branch at said juncture being no greater than approximately 10 degrees.

8. The pneumatic radial passenger tire according to claim 1, 2, 3, 4 or 5 wherein the included angle between the centerline of each main groove with the centerline of the respective second branch at said juncture being no greater than approximately 10 degrees.

9. The pneumatic radial passenger tire according to claim 1, 2, 3, 4 or 5 wherein the main grooves associated with one tread edge being spaced apart axially of the tire from the main grooves associated with the other tread edge to form a continuous or broken rib therebetween.

10. The pneumatic radial passenger tire according to claim 1, 2, 3, 4 or 5 wherein the axially inner end of each of said second branches being connected to and brought into communication with the second circumferentially adjacent main groove, wherein each main groove and its respective second branch associated with one tread edge are spaced from the mid-circumferential centerplane of the tire a distance equal to between two percent (2%) and ten percent (10%) of the tread width.

11. The pneumatic radial passenger tire according to claim 1, 2, 3, 4 or 5 wherein the generally curvilinear path of said main groove has a radius of curvature which is greater at the axially inner end than at the axially outer end.

12. The pneumatic radial passenger tire according to claim 1, 2, 3, 4 or 5 wherein the curvilinear path of said first branch and second branch has a radius of curvature which is greater at the axially outer end thereof than at the axially inner end thereof.

13. The pneumatic radial passenger tire according to claim 1, 2, 3, 4 or 5 wherein said main grooves and their respective first and second branches form a majority of the grooves of said tread and the relief elements formed by said main grooves and first and second branches being devoid of any slots or narrow grooves having a width substantially smaller than that of the main grooves or branches.

14. The pneumatic radial passenger tire according to claim 1 wherein said intermediate groove is disposed approximately between said adjacent main grooves and terminate at a point spaced from the tread edge from which it extends a distance of about thirty percent (30%) of the tread width TW.

15. The pneumatic radial passenger tire according to claim 1, 2, 3, 4 or 5 wherein the included angle between the centerline of each main groove with the centerline of the respective first branch at said juncture being no greater than about 10 degrees, the included angle between the centerline of each main groove with the centerline of the respective second branch at said second juncture being no greater than approximately 10 degrees, the axially inner end of each of said second branches being connected to and brought into communication with the second circumferential adjacent main groove.

16. The pneumatic radial passenger tire according to claim 15 wherein said generally curvilinear path of said main grooves and said first and second branches has a radius of curvature which is greater at the axially inner end than at the axially outer end.

17. The pneumatic radial passenger tire according to claim 15 wherein said main grooves, said first branches and said second branches form a majority of the grooves in the tread, the relief elements formed by said grooves being devoid of any slots or narrow grooves having a width substantially smaller than the main grooves or branches.

18. The pneumatic radial passenger tire according to claim 15 wherein the main groove associated with one tread edge being spaced apart axially of the tire from the main grooves associated with the other tread edge to form a continuous or broken rib therebetween.

19. The pneumatic radial passenger tire according to claim 15 wherein the main grooves and their respective branches associated with one tread edge are spaced a distance from the mid-circumferential centerplane of the tire a distance between two percent (2%) and ten percent (10%) of the tread width.

* * * * *

UNITED STATES PATENT AND TRADEMARK OFFICE
CERTIFICATE OF CORRECTION

PATENT NO. : 4424843

DATED : January 10, 1984

INVENTOR(S) : Jean F. L. Fontaine & Maurice Graas

It is certified that error appears in the above-identified patent and that said Letters Patent are hereby corrected as shown below:

Claim 18, line 34, change groove to grooves

Signed and Sealed this

Twentieth Day of March 1984

[SEAL]

Attest:

GERALD J. MOSSINGHOFF

Attesting Officer     Commissioner of Patents and Trademarks